3,472,028
**AIRCRAFT JET ENGINES HAVING AFTER-
BURNERS AND ADJUSTABLE JET PIPES**
Jacques Aubert, Chatenay-Malabry, and Jean-Max Marie
 Silhouette, Moissy-Cramayel, France, assignors to So-
 ciete Nationale d'Etude et de Construction de Moteurs
 d'Aviation, Paris, France
Continuation of application Ser. No. 533,210, Mar. 10,
 1966. This application Mar. 28, 1968, Ser. No. 717,051
 Claims priority, application France, Mar. 10, 1965,
8,711
Int. Cl. F02k *1/16, 1/18;* B64c *15/00*
U.S. Cl. 60—237                                          6 Claims

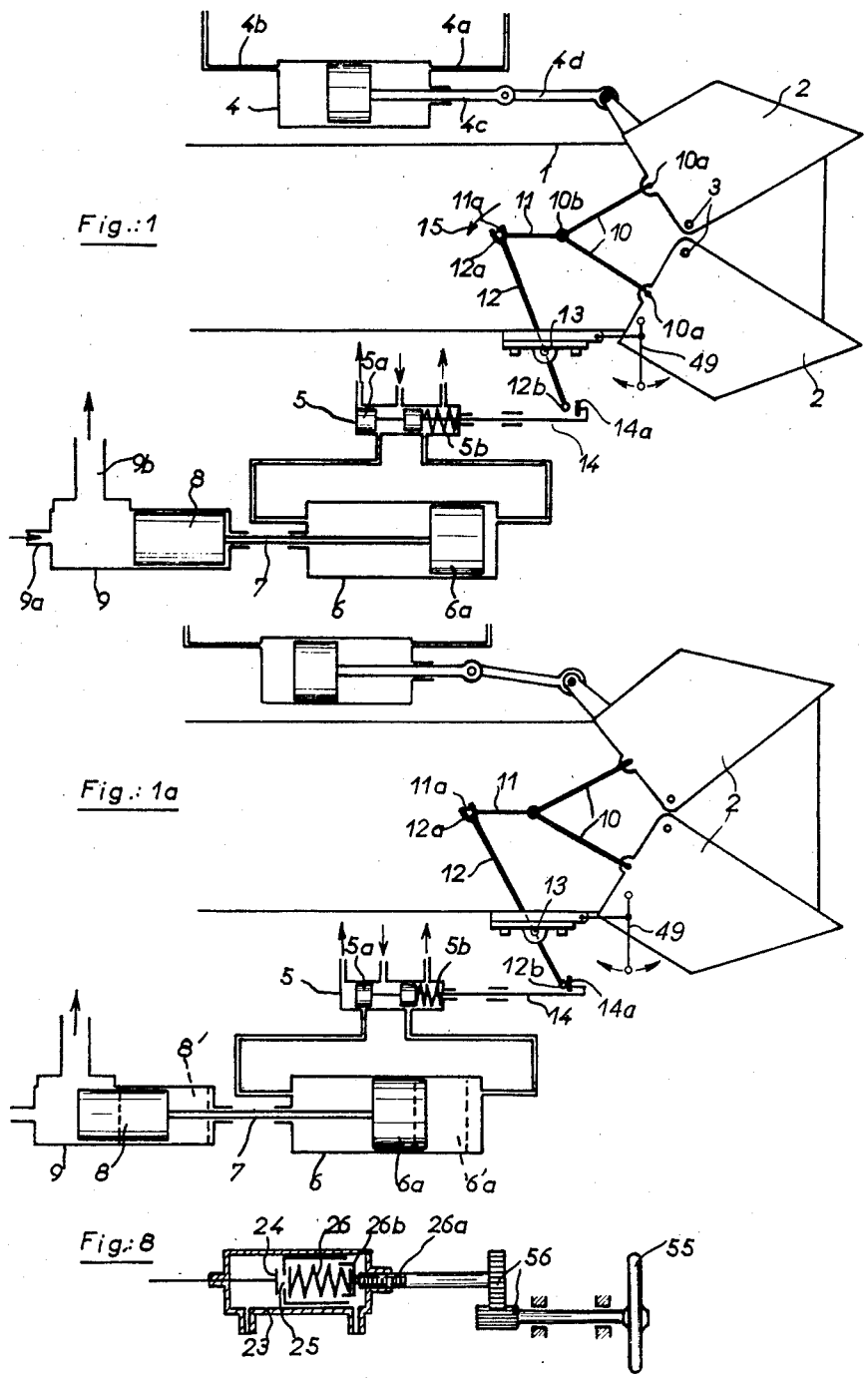

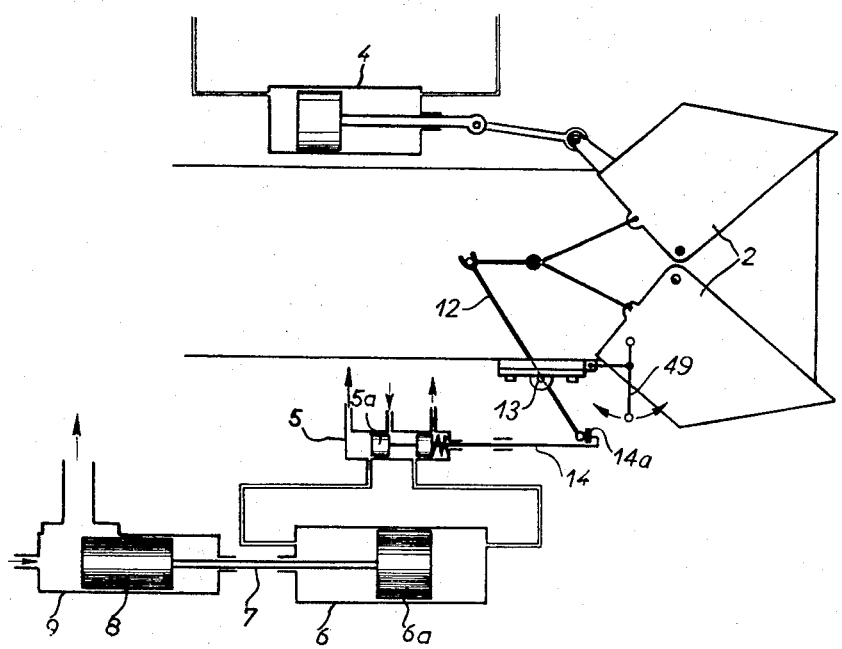
Fig.: 1b
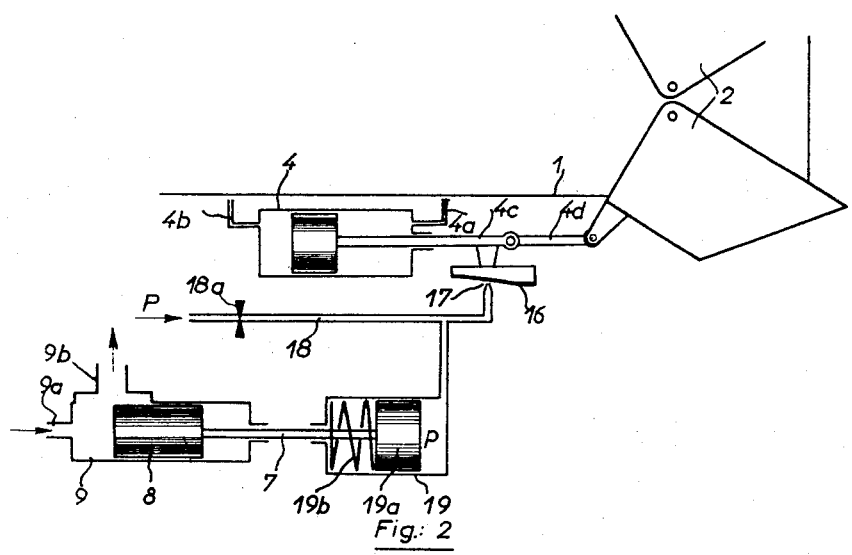
Fig.: 2

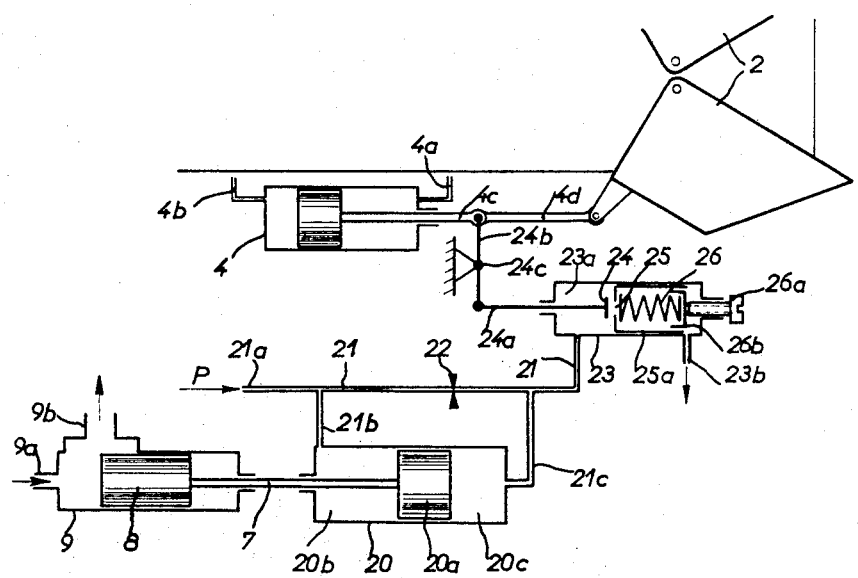
Fig.: 3
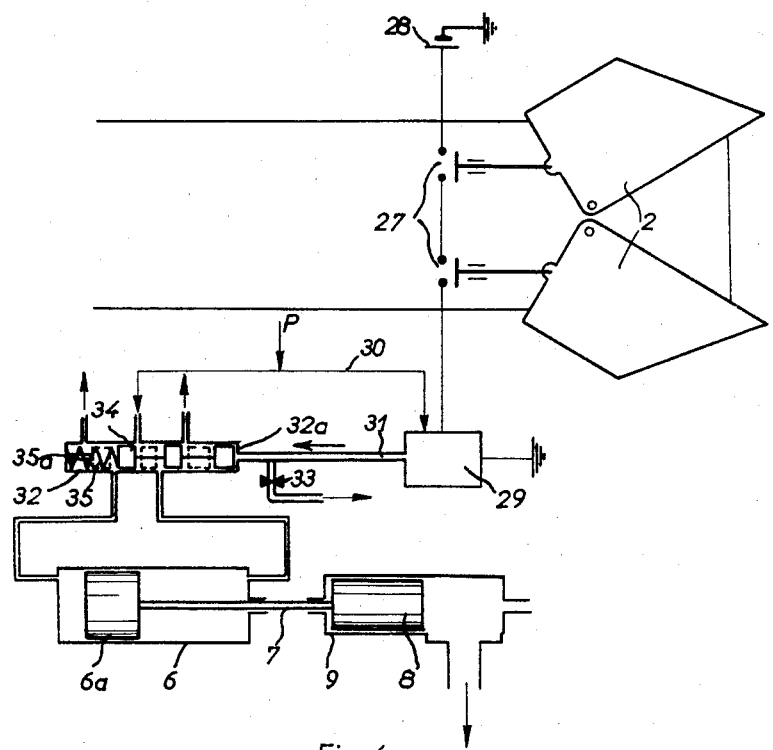
Fig.: 4

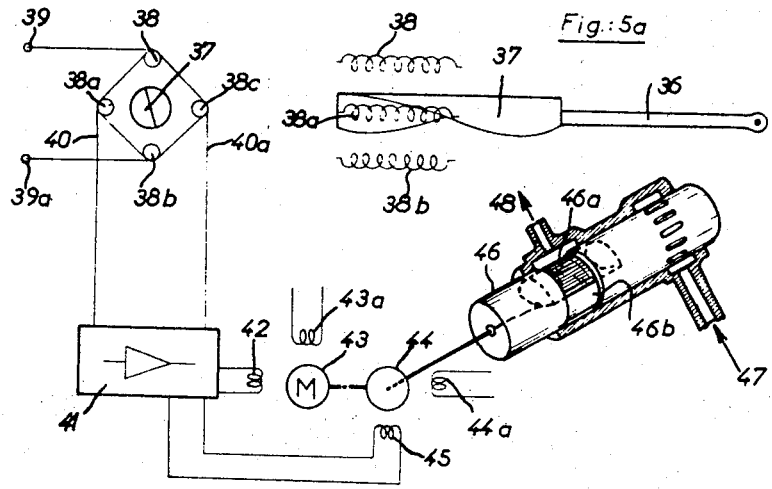
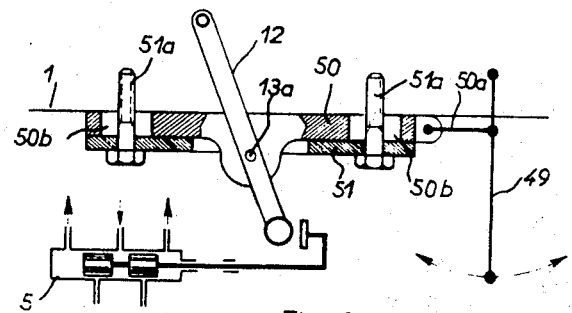
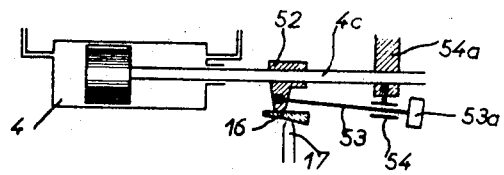

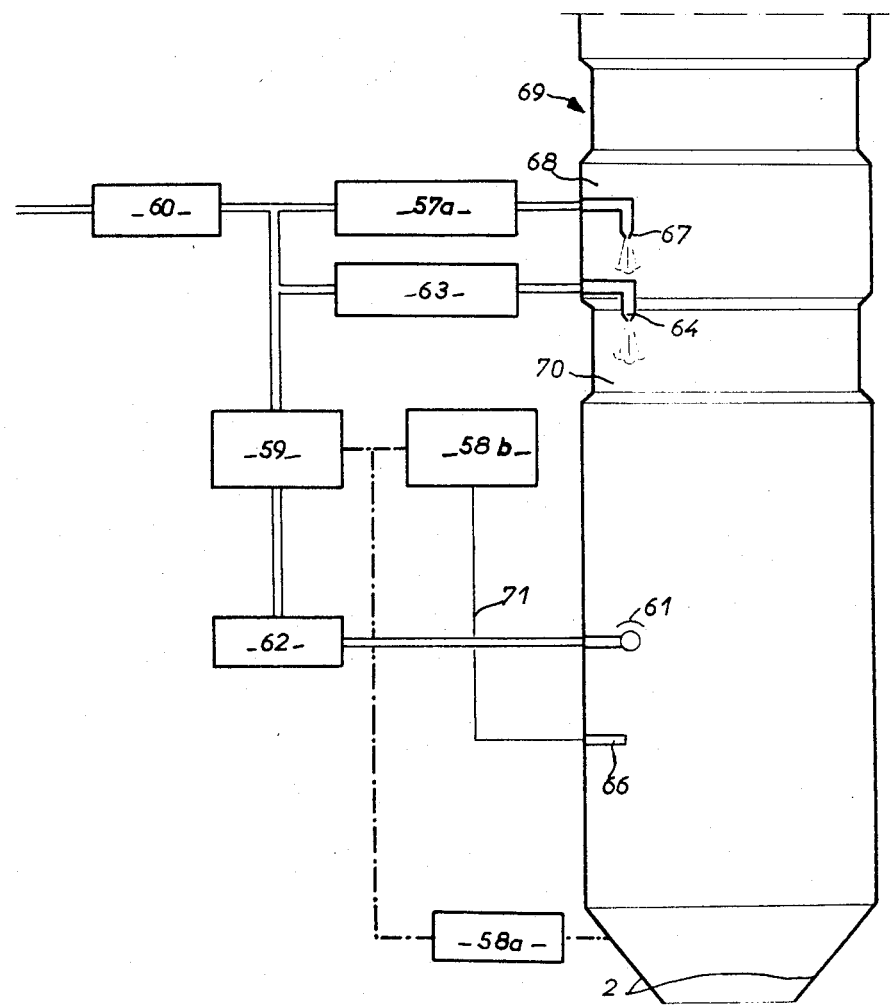
Fig.: 10

ABSTRACT OF THE DISCLOSURE

An afterburner control for a turbojet having a variable-area nozzle which is regulated as a function of at least one operative characteristic of the turbojet. This afterburner control is governed solely by the nozzle area, and comprises means for decreasing or increasing the afterburner fuel flow according to whether the nozzle area is more or less than a preselected area which is slightly less than the maximum area of the nozzle.

---

This is a continuation of application Ser. No. 533,210, filed Mar. 10, 1966 now abandoned.

This invention relates to aircraft powered by one or more jet engines provided with afterburners (or reheat devices) and with adjustable nozzle ejection section area.

An object of the invention is to provide an improved method for regulating jet engines and also to provide a device for carrying out this method of regulation.

In accordance with the present invention, the regulation means is capable, when the reheat is in operation, of maintaining the nozzle ejection section area at least close to a preselected value and of regulating the afterburner fuel flow rate in such a manner that the nozzle is "full" or fully utilized at said ejection section area. With this in view, with the jet pipe section regulated, that is to say, controlled by a regulating device as a function of one or more characteristics of the jet engine, the reheat fuel flow rate is controlled according to the sense of the difference between the actual value of the nozzle ejection section area and a preselected value of said area that must be at least slightly less than the maximum possible opening of the jet pipe section.

This preselected value of the nozzle ejection section area may also be modifiable by the pilot or under his control within two suitable limits.

For instance the reheat fuel flow rate will be metered as a function of the nozzle ejection section area in such a manner as to be increasing or at its maximum so long as said section area is less than the preselected section area and to be decreasing when said section area exceeds or attains the preselected section area.

The invention applies more especially to jet engines or single-spool or multi-spool type and with one or more flows. While operating without the reheat, the regulation means can maintain two jet engine characteristics either constant, or variable according to a program, or equal to preselected values, these characteristics being selected for example from among the following:

The speed or speeds of rotation, according to whether the jet engine is single-spool or multi-spool;

The temperature ahead of or behind the turbine or turbines;

The expansion ratio in the turbine or turbines;

The compression ratio in the compressor or compressors.

For example, a so-called "main" regulating device and a so-called "nozzle" regulating device may act conjointly, in a known manner, so as to program these two characteristics as a function of the values of one or more parameters that may be selected from among the following:

The air temperature at the jet engine intake;

The air pressure at the jet engine intake;

The speed of flight of the aircraft;

The position of the pilot lever;

The air pressure at the entrance to the jet engine's combustion chambers;

The air temperature at the entrance to the jet engine's combustion chambers.

One at least of the jet engine's characteristics may also be "displayed," more especially by the intake member that is to say, maintained at a value imposed by the cross-section area of said intake member.

The main regulating device (acting on the flow of fuel injected into the jet engine combustion chambers) and the nozzle regulating device (acting on the nozzle ejection section area) together form the main regulation means. The two devices can be combined into a single unit.

The two characteristics governed by the main regulation means are not disturbed by the actuation of the reheat, since said main regulation means then opens the nozzle at the demand of said characteristics. As the nozzle ejection section area approaches its preselected value, the reheat regulation means according to the invention reduces the reheat fuel flow rate and the thermal obstruction, created by reheating inside the nozzle, stops increasing. The main regulation means does not incur the danger of reaching saturation, since the preselected section area of the nozzle (from which the reheat load ceases to increase, or else decreases) is at least slightly lower than its maximum value. It should be noted that a difference between these two values is necessary in order to avoid risk to saturation of the main regulation means.

The regulated reheat load is, in fact, a function of the difference between the nozzle ejection section area value while operating dry (that is to say, when the reheat is not functioning) and the preselected section area.

The afterburner fuel flow rate is preferably controlled by the nozzle itself, that is to say, by the members that cause its ejection section area to vary. To control said flow rate, use may more especially be made to output signals from a device which comprises, in order to detect the preselected section area of the nozzle, a mechanical detector, a pneumatic or hydraulic potentiometer, or an electrical potentiometer.

In short, when operating at stabilized speeds, the difference between the actual and the preselected section area of the nozzle, when suitably amplified, will continuously feed an integrating device which will continually adjust the reheat fuel flow rate. Said preselected section area will be such that no reaction ensues on the normal functioning of the turbo-jet and will therefore be, at most, very close to maximum opening, with the degree of movement needed to call into action the nozzle adjustment means as the sole guard before the mechanical limit stop.

On the other hand, when the reheat is lit or extinguished, since too abrupt an actuation incurs the risk of damaging the engine if the nozzle section area does not change quickly enough, it may be important to give these two actions a time-delay.

The afterburner fuel flow rate may therefore vary during a transitional state. After the pilot has ordered the actuation of the reheat, this flow rate can increase up to its normal value, as controlled by the regulation means, according to a programmed time-delay, or can be made subject to a light-up signal so that the reheat fuel inlet is only wide open after the fuel has been effectively ignited while flowing at a lesser rate. After the cease-flow command, the flow rate can decrease according to a programmed time-delay until the reheat has been completely cut off.

The following description having reference to the annexed drawings and given by way of nonlimitative example will bring out more clearly the various features of the invention and the manner of putting them into effect, any arrangement emerging either from the text or from the drawings being within the scope of said invention.

In the drawings,

FIGURES 1, 1a and 1b show diagrammatically an adjusting device for the reheat of a jet engine including a mechanically actuated integrator, respectively shown in three different positions;

FIGURE 2 shows diagrammatically a device with a pneumatic potentiometer;

FIGURE 3 shows diagrammatically a device with a hydraulic potentiometer;

FIGURE 4 shows diagrammatically a detection device with electrical contactors;

FIGURE 5 shows diagrammatically a detection device with an inductive electrical detector;

FIGURE 5a is a diagrammatical front view of the detector of FIGURE 5;

Figure 9:
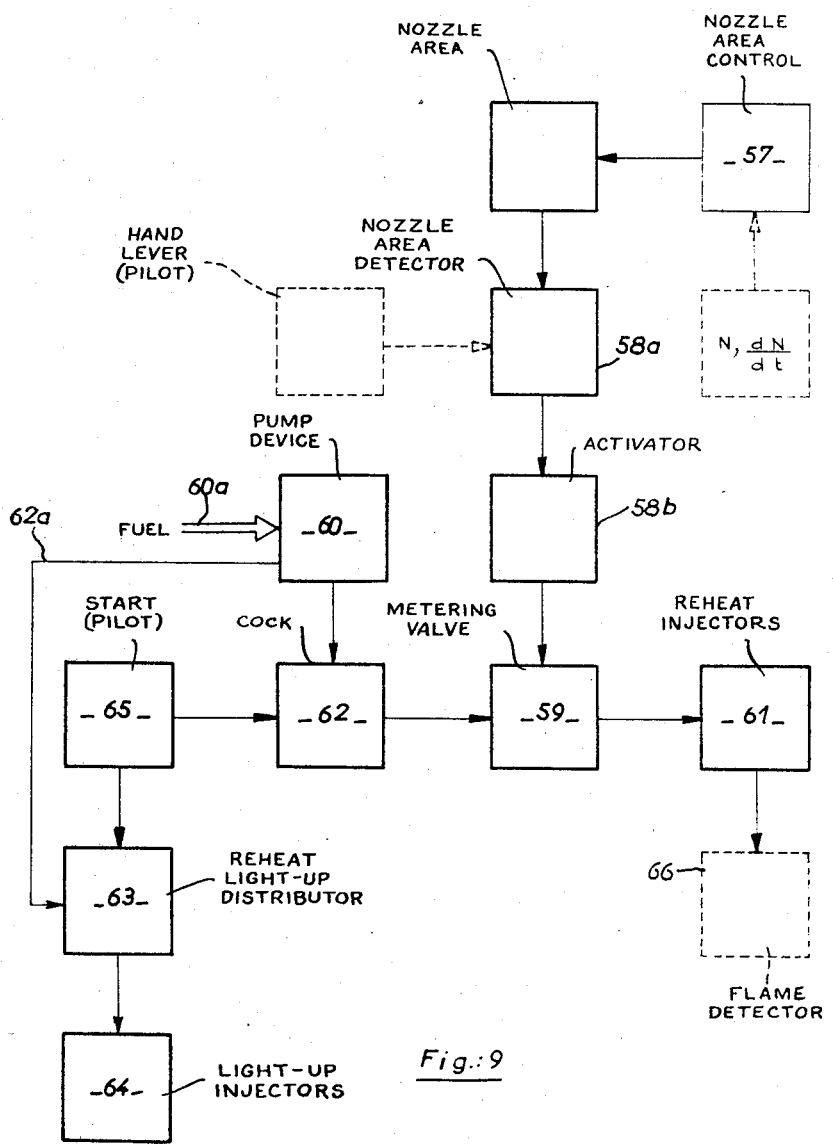

FIGURES 6, 7 and 8 respectively show modifications of the devices in FIGURES 1, 2 and 3;

FIGURE 9 is a block diagram of regulation means according to the invention;

FIGURE 10 is the actual diagram of such regulation means.

FIGURE 1 shows an integrator that adjusts the reheat fuel flow rate under the dependence of the ejection section area of the nozzle, which is detected by mechanical means. The jet pipe 1 is provided with flaps 2 pivoting about axes 3 under the action of a jack 4 which adjusts the section area of the jet pipe exhaust nozzle in a known manner. By means of an appropriate transmission mechanism the flaps 2 control a pilot valve 5 for controlling a servo-motor 6 having a piston 6a which, through the intermediary of a rod 7, actuates a plunger 8 of a reheat fuel throttle valve 9. This transmission mechanism is shown diagrammatically by the links 10 which, via a rod 11, actuate a lever 12 pivoting at 13 and controlling the rod 14 for operating the pilot valve 5. The links 10 are each hinged to one of the flaps 2, at a point 10a, and are mounted to pivot at 10b on one end of the rod 11, the other end of which is hinged, following the axis 11a, within a forked end 12a of the lever 12.

The nozzle adjustment means acts in a known manner to the demand of the engine characteristics which it governs, by directing a command fluid into the feed pipes 4a or 4b of the jack 4, which through the intermediary of a rod 4c and of a link 4d causes the flaps 2 to pivot so as to open or close the nozzle. A slide-valve 5a of the pilot valve 5 is urged to the left by a compression spring 5b and, so long as the section area defined between the flaps 2 is below the preselected value (FIGURE 1), the end 12b of the lever 12 remains to the left of a limit stop 14a for the rod 14, which is itself kept at the end of its stroke (to the left) by the spring 5b. The pilot valve 5 supplies the servo-motor 6 in a known manner with pressurized fluid, and it will be seen that in this position of the rod 14 and of the piston 5a the servo-motor piston 6a is kept at the end of its stroke to the right and its rod 7 retains to the right the plunger 8 of the throttle valve 9, so that the latter maintains at its widest the passage for the reheat fuel admitted under pressure at 9a and departing at 9b towards the afterburner injectors.

When the reheat has been lit and thus supplied with a full flow an obstruction of the engine's pipe occurs due to the increase in the volume of gas therein as a consequence of the nozzle's inadequate ejection section area, which had been previously adjusted for the engine when running "dry." From this there ensues a variation in the engine characteristics that are governed by the main regulating device and the nozzle adjustment device. For example, the expansion ratio at the turbine decreases, the power transmitted to the compressor shaft consequently decreases and the turbine rotation speed decreases. Assuming a main regulation means for maintaining a constant rotation speed, the speed governor of the main regulation means reestablishes the rotation speed at its initial value by increasing the fuel flow rate. There ensues a rise in temperature ahead of the turbine, and the nozzle regulating device, which is for example a thermal regulator, opens the nozzle to compensate for this temperature rise by acting on the jack 4, which causes the flaps 2 to pivot in an opening direction. As they pivot in this direction, the flaps 2 shift the links 10 and these actuate the rod 11 towards the left. Said rod 11 causes the lever 12 to pivot in the direction of the arrow 15, and the lever end 12b comes in contact with the limit stop 14a and shifts it towards the right until the rod 14 brings the pilot slide-valve 5a back to the neutral condition shown in FIGURE 1a, so that the servo-motor 6 no longer receives an input and remains in the position in which it keeps the throttle valve wide open. This position of the servo-motor piston and of the throttle valve plunger is shown in chain-dotted lines at 6'a and at 8' in FIGURE 1a wherein the flaps 10a are in the preselected position.

Since the reheat fuel flow is still wide open, the nozzle regulating means continues to cause the flaps 2 to expand in the opening direction, eventually to attain the position shown in FIGURE 1b, in which the lever 12 maintains the rod 14 and the slide-valve 5a beyond the neutral position towards the right, so that the pilot valve 5 supplies the servo-motor 6 in such a manner that the piston 6a moves towards the left, shifting the plunger 8 in the direction for closing the throttle valve 9. As the latter closes, it decreases the reheat fuel flow rate. From this there results a variation in the other direction of the characteristics governed by the main regulator and the nozzle regulating means, and the latter acts on the jack 4 to cause the flaps 2 to swing in the direction of closing.

Thus the condition of FIGURE 1a is quickly reattained. In this condition, the flaps 2 are located in the preselected opening position that keeps the pilot valve 5 in its neutral position, the piston 6a of the servo-motor 6 having brought the plunger 8 into the position depicted in unbroken lines, in which the valve 9 permits passage to the reheat fuel flow which is adjusted to said preselected position of the flaps 2.

FIGURE 2, in which the nozzle 1 and its flaps 2 are shown only partially, demonstrates a device that makes the opening of the throttle valve 9 subject to the position of a pneumatic potentiometer which detects the position of the flaps 2. A cam 16 which moves with the flaps 2 and is, for example, rigid with the rod 4c of the nozzle jack 4, governs the bleed flow at a nozzle 17 of a pipe 18 supplied with air or gas at a constant pressure P by way of a restriction 18a and supplying a pneumatic servo-motor 19. The bleed at the nozzle 17 determines the pressure p acting on the right-hand face of a piston 19a of said servo-motor against the action of a spring 19b. Said piston 19a is connected to the end of the rod 7 of the plunger 8 belonging to the throttle valve 9. When the jack 4 opens or closes the flaps 2 it displaces the cam 16 to the left or right, which causes the bleed at the nozzle 17 to vary, and consequently the pressure p. The piston 19a then moves towards a fresh position of equilibrium, so compressing the spring 19b to a greater or lesser extent and so shifting the plunger 8, which opens the valve 9 more or less. A given position of the plunger 8 thus corresponds to each position of the flaps 2.

The contour of the cam 16 is such that the throttle valve 9 remains wide open so long as the flaps 2 are less expanded, i.e., less widely apart than their preselected opening position. When the flaps 2 are wider apart than this preselected opening position the cam 16 is displaced to the left, to such a position that the bleed at the nozzle 17 decreases and consequently the pressure p increases, moving the piston 19a and the plunger 8 to the left, against the action of the spring 19b, until a fresh position is reached, in which the plunger 8 partially closes the valve 9.

As in the case of FIGURE 1, the thermodynamic action of the reheat on the engine causes a reaction of the main regulation means, of which the nozzle adjustment means moves the flaps 2 wider apart, and these become stabilized in a position corresponding to their preselected position. In said adjusted position of the flaps 2, for example the position shown in the drawing, the ejection section area of the nozzle is very close to the preselected value and the plunger 8 governs the reheat fuel flow rate at such a value that the nozzle is "full" or fully utilized at this opening, whereas the "gas generator" (that is to say, the portion of the engine located upstream of the afterburner) behaves as if there were no reheat.

In the arrangement of FIGURE 2, the position of the flaps 2 is detected by a pneumatic potentiometer, which includes the cam 16 controlling the bleed at the nozzle 17. Said pneumatic potentiometer may be replaced by a hydraulic or electrical potentiometer operating in an analogous manner. Detection by potentiometer permits the introduction of a supplementary parameter into the reheat regulation system. For example, the pressure P admitted at 18a can be made subject to altitude or to any other function following any law and for governing the reheat fuel flow rate in such a way as to make this rate independent of the characteristics of the spring 19b.

FIGURE 3 shows a device in which detection is effected by a hydraulic potentiometer. This serves as a pilot valve for a servo-motor 20 of the throttle valve 9, which is controlled, as in the example in FIGURE 1, in the direction of opening or closing, according to whether the nozzle ejection section area is less than or greater than its preselected value. The rod 7 of the plunger 8 is integral with a differential piston 20a, the small face (that bearing the rod 7) of which receives a constant hydraulic pressure P and the other face of which receives the same pressure reduced in a restriction 22 and modulated in a variable manner, according to the position of the flaps 2, in a variable bleed unit 23.

With this in view, a pipe 21 receives at its inlet 21a the hydraulic pressure P and directs it by a branch pipe 21b into the left-hand chamber 20b of the servo-motor 20. Downstream of the restriction 22 a second branch pipe 21c directs the reduced pressure into the other chamber 20c of the servo-motor 20. The pipe 21 leads to the left-hand chamber 23a of the unit 23 and the hydraulic fluid escape therefrom through a pipe 23b, after having traversed the orifice 25 which is controlled by an obturator 24 in such a manner as to constitute the variable bleed. The position of obturator 24 is controlled by the flaps 2, the obtuator being for example integral with a sliding rod 24a hinged onto a lever 24b, the rocking motion of which, about a fixed support 24c, is controlled by the rod 4c of the jack 4 controlling the flaps 2. The orifice 25 is provided with a sleeve 25a sliding within the cylinder 23 and urged towards the left by a spring 26 supported on a cup 26b that slides under the action of an adjustment screw 26a.

A movement to the left of the jack rod 4c, which brings about the opening of the flaps 2, causes the lever 24b to swing in a counter-clockwise direction, and the latter causes the obturator 24 to approach the orifice 25, so decreasing the bleed and consequently increasing the presure downstream of the restriction 22 and inside the chamber 20c. Conversely, the closing of the flaps 2 causes a decrease of this pressure. The position of the orifice is governed by means of the adjustment screw 26a so that, when the flaps 2 are in their preselected position, the pressure in the chamber 20c exactly balances on the piston 20a the constant pressure P in the chamber 20b, so maintaining said piston 20a and the plunger 8 in the position occupied by such members.

The mode of operation is therefore similar to that of the device in FIGURE 1, the flaps 2 being stabilized in their preselected position and the plunger 8 being in the position which adjusts the reheat fuel flow rate at its maximum value compatible with said position of the flaps, the "gas generator" behaving as if there were no reheat.

It will be apparent that the hydraulic potentiometer (constituted by the variable bleed unit 23 controlled by the nozzle flaps and modulating the pressure downstream of the restriction 22) can be replaced by any other kind of potentiometer that serves as a distributor or a pilot valve to an appropriate servo-motor.

In place of a detection device that is mechanical or hydraulic or pneumatic to detect the position of the nozzle flaps, a detection device can alternatively be used which operates by an electrical signal transmitted either by a simple contactor or by an electrical or magnetic potentiometer, said signal acting for example on an electrically operable hydraulic valve.

In FIGURE 4, the contactors 27, supplied by an electric current source 28, are mounted in series on the various flaps 2 in such a way as to neutralize the individual in-and-out movements of the latter. When the flaps 2 have reached their preselected position, they close all the contactors 27 and the current from the source 28 is directed into an electro-valve 29. This remains in the normal closed position so long as it is not energized; but as soon as it is energized by the contactors 27 closing, it opens and transmits the hydraulic pressure P of a tube 30 into a duct 31 equipped with a calibrated bleed 33 and leading to a chamber 32a of the pilot valve 32 of the hydraulic servo-motor 6 pertaining to the throttle valve 9. A slidevalve 34 of the pilot valve 32 is urged towards the right by a spring 35, its stroke to the left being restricted by a limit stop 35a.

When the engine is operating without the reheat, the flaps 2 are not wide apart and keep the contactors 27 open.

The spring 35 presses the slide-valve 34 towards the right, the pressure in the chamber 32a being relieved by the bleed 33, and the pressure P of the tube 30 is directed to the right-hand face of the piston 6a, which consequently keeps the throttle valve 9 wide open. When the reheat is lit, the throttle valve 9 stays wide open and the flaps 2 open under the action of the nozzle adjustment means, as in the case of the foregoing arrangement. When the flaps have reached their preselected position and when all the contactors 27 have been closed, the electro-valve 29 opens and directs the pressure P into the chamber 32a, this resulting in the slide-valve 34 being pressed back onto the limit stop 35a against the action of the spring 35. In this position of the slide-valve 34, as shown in chain-dotted lines in FIGURE 4, the presure P of the tube 30 is directed to the left-hand face of the piston 6a, and the latter causes the throttle valve 9 to move in the direction of closing. From this there results a decrease in the reheat fuel flow rate which causes the closing of the flaps 2 through the reaction of the nozzle regulating means. The closing of the flaps 2 causes the opening of the contactors 27, which in its turn causes the closing of the valve 29. The pressure in the chamber 32a is relieved via the bleed 33 and the spring 35 urges the slide-valve 34 to the right so that the piston 6a receives the pressure P on its right-hand face and opens the throttle valve 9 afresh. A regulated arrangement is therefore maintained by successive oscillations, in which the flaps 2 oscillate about a mean position that closely approximates to their preselected position, and the reheat fuel flow rate oscillate about a mean value that is adjusted to said position of the nozzle flaps.

Obviously it is not essential to detect the position of each one of the flaps of a nozzle having multiple flaps. By a judicious selection it is possible to define a mean probability of function for the flaps and consequently to limit the number of contactors 27. It is even possible to envisage a single contactor 27 controlled by one suitably selected flap.

Detection can also be effected by a capacitive inductive or magnetic detector using known present-day techniques, with electronic or magnetic amplification if required.

In FIGURES 5 and 5a, the jet pipe flap position is detected by a linear inductive detection device. A rod sliding longitudinally under the action of the nozzle flaps (not shown), bears a helically grooved shank 37 which by its longitudinal movement modifies the reluctances of four coils 38, 38a, 38b, 38c that form a Wheatstone bridge, the terminals 39, 39a of which are linked to an electric current source. The current leaving the terminals 40, 40a is directed into an amplifier 41 the output of which is fed to a winding 42 of a motor 43 whose excitation means is at 43a. Said motor 43 is coupled to a generator 44 whose excitation means is shown at 44a. The current produced in the winding of said generator is applied, by means of a suitable reactance and by way of the amplifier 41, to the winding 42 of the motor 43. On the common shaft of the motor 43 and the generator 44 there is keyed a rotating plug 46a which cooperates with a metering lot 46b of a metering unit 46 to govern the reheat fuel flow admitted under pressure at 47 and finding egress at 48 towards the afterburner injectors.

The grooved shank 37, caused to undergo translation by the nozzle flaps (not shown), is arranged so as to modify induction in the windings of the Wheatstone bridge when said flaps pass through their preselected position. The motor 43, the winding 42 of which is fed with current supplied by the terminals 40, 40a and amplified at 41, rotates in the opening or closing direction of the metering unit 46 according to whether the opening of the nozzle flaps that shift the shank 37 is less than or greater than its preselected value.

Operation is therefore similar to that in the arrangement in FIGURES 1 and 3.

The generator 44 imposes a time-delay on the movement of the plug 46a. In fact, the current produced in the winding 45 of such generator 44 is fed back to the winding 42 of the motor 43, in the sense that will impose the required time-delay on its movement.

The devices described with reference to FIGURES 1 to 5 operate at a stabilized speed of operation, that is to say, when the reheat has been lit for some time and when the jet pipe has reached its preselected position. It goes without saying that, for light-up and for extinguishing the afterburner, a time-delay device will have to be envisaged to ensure that the characteristics controlled by the main regulation means do not reach dangerous values. Such a device, already known in itself, may be effected by a sequential system or, again, by a system both sequential and time-delayed.

In case the regulation means should pass out of adjustment, safety may be ensured by reducing or stopping the reheat fuel flow when the main regulation means has reached saturation. Such a safety device may, for example, be controlled automatically so as to completely shut off or reduce the reheat fuel flow when one of the characteristics governed by the main regulation means reaches a dangerous or prohibited value.

It will be seen that one advantage in the devices described is to allow the full capacity of a jet engine's reheat device to be utilized in every flight situation, without fear of disturbing the operation of the "gas generator" and of the air intake member in instances where said generator regulates the flow rate of air so as to make the proper operation of said member satisfactory. The full capacity of the jet-engine's reheat device can also be utilized, since the engine can operate with its nozzle closely approximating to maximum aperture, and since the weight and dimensions of the rear portion of the jet engine are almost proportional to the nozzle ejection section area when wide open. In other words, it is possible to fill the nozzle completely.

However, as has been said in the introduction to this description, it is possible to modify the devices described in order to allow the pilot to modify the preselected value of the nozzle section area, and consequently to exert an effect on the adjusted reheat fuel flow rate for cases of partial utilization. With this in view, the nozzle position detector will be movable, the control signal for effecting its movement being generated as a function of the position of the pilot lever. It is apparent that the movement of the detector should only be possible between two limits; on the one hand, the preselected value of the nozzle section area as detected should remain slightly less than maximum section area so as to avoid reaching the saturation point of the nozzle regulating device; on the other hand, said detected value must not be too small, so that the corresponding value for the reheat fuel flow rate incurs no danger of being lower than the flow rate essential for light-up.

FIGURE 6 shows how the device in FIGURE 1 can be modified to allow the detector to be shifted by means of the hand-lever 49. With this in view, the pivot-point 13a of the lever 12 is not fixed but is carried by a strap 50 mounted to slide on the wall of the nozzle 1, its sliding motion being controlled by a link 50a operated by the lever 49. The sliding assembly of the strap 50 may be carried out, as can be seen from the drawing, by means of a small plate 51 attached to the wall of the nozzle 1 by means of bolts 51a which engage in openings 50b of the strap 50. The latter slides with slight friction between the plate 51 and the wall of the nozzle 1 and the edges of the openings 50b constitute limit stops that restrict its movement.

In FIGURE 7, which shows a modification of FIGURE 2, it is the cam 16 that the pilot causes to slide along the rod 4c belonging to the piston of the nozzle jack 4. The cam 16 is not attached to said rod 4c as in FIGURE 2, but is rigid with a block 52 that slides along said rod 4c under the action of a link 53 controlled by the pilot. Said link 53 slides in a slide-way 54 mounted on a support 54a which is rigid with the rod 4c, and its tip 53a is linked to the pilot lever by means not here shown.

The arrangement in FIGURE 3 may be modified as is shown in FIGURE 8 to allow the pilot to change the preselected opening position of the nozzle as detected by the detector 23. As has been indicated with reference to FIGURE 3, the screw 26a allows the pressure of the spring 26 that determines the position of the orifice 25 to be adjusted, and consequently allows the preselected position of the flaps 2, as detected by the detector 23, also to be adjusted. In FIGURE 8, this adjuster screw 26a is controlled by the pilot by means of a handwheel 55, with the interposition of gearing 56.

It will be clear the FIGURES 6, 7 and 8 are described only by way of example. Many other means can be envisaged for allowing the pilot to adjust the detector, more especially by linking the detecting unit to the nozzle by a variable-length transmission system such as a Bowden type cable operable under the pilot's supervision.

The limiting of the detector's displacement can be effected by a mechanical limit stop restricting the movement of the unit at the pilot's choice (as in FIGURE 6) or by bringing about a bleed in the distributor or pilot valve of the control jack belonging to the reheat fuel metering device or, again, by an electrical signal. Naturally, means suited to the particular detecting device being employed will be selected, all these means giving identical results.

FIGURE 9 is a working diagram of a complete regulation means for a turbo-jet's reheat device by means of the engine's nozzle ejection section area. At 57 will be seen the main regulation means which, as has been said, may include a main regulating device that governs fuel flow injected into the combustion chambers and a nozzle regulating device that governs the nozzle ejection section area. In the example shown, the two characteristics of the engine that are governed by said main regulation means are in rotation rate N and its derivative $dN/dt$. At 58a will be seen the nozzle section area detector, and at 58b the integrator or the distributor that may be one of the types shown in the foregoing figures, the detector 58a possibly being under the dependance of a selector controlled by the pilot as in the case of FIGURES 6 to 8. The integrator or the distributor controls the reheat fuel flow metering or throttle valve 59, which may be of the same type as the valves 9 or 46 in the foregoing figures.

The reheat fuel is admitted at 60a to a pumping device 60 which pumps the fuel under pressure towards the throttle valve 59 by way of a stopcock 62. The fuel metered by said valve 59 is directed to the reheat injectors 61. The pumping device 60 also directs the pressurized fuel into a pipe 62a that has a port in a reheat light-up fuel distributor 63 which directs it into the light-up injectors 64.

A device 65 for starting up the reheat allows the pilot on the one hand to open the light-up device 63, and on the other the stopcock 62. Besides this, a flame-detector 66 may be envisaged that is located in the jet pipe downstream of the reheat fuel injectors 61. If such a flame-detector is provided, the following sequences may be carried out. The injectors 61 are fed in an idling tempo, and when the fuel injected thus at this tempo has been lit by the light-up injectors 64, the flame-detector opens the supply to the injectors 61 full-cock. A device must be provided in the regulation means that will allow the injectors 61 to be supplied slowly or at the full rate under the control of the flame-detector 66. This device can be constituted by the stopcock 62.

The stopcock 62 is therefore a safety device allowing the admission of reheat fuel to the injector 61 to be cut off in the event of light-up not taking place, this cut off depending on the flame-detector, or on any other safety factor. Said stopcock 62 can be located either upstream or downstream of the proportioning valve 59.

FIGURE 10 is an actual diagram of the fuel circuits, and in such diagram the main units of the regulation means are represented. The pumping device 60 supplies fuel on the one hand to the main fuel injectors 67 located in the combustion chambers 68 of the engine 69, under the control of the main regulating device 57a, and, on the other hand, to the reheat device, that is to say, when so required to the light-up injectors 64 located upstream (or downstream) of the turbine 70, under the control of the light-up distributor 63, and to the metering valve 59 which supplies the reheat injectors 61, shown diagrammatically in the form of a burner ring. It will be noted that in this diagram the stopcock 62 is located downstream of the metering unit 59.

Broken lines of varying length show the connection between the nozzle section area detector 58a, which detects the position of the nozzle flaps 2, and the remainder of the reheat regulation means 58b (distributor or integrator) and the metering unit 59. The nozzle regulating device is not shown. The connection between the flame detector 66 and the regulation means 58b is shown in unbroken lines at 71.

What is claimed is:

1. In a turbojet having an afterburner, a flow meter for controlling the flow of fuel fed to the afterburner, a variable-area nozzle including at least one movable member adapted to be expanded and restricted to increase and decrease the area of the nozzle, and a nozzle area control to expand and restrict the movable member responsive to at least one operative characteristic of the turbojet, an afterburner control responsive to expansion and restriction of the movable member over a preselected position thereof and consisting of an electrically operable actuator comprising a motor and a generator having a common shaft for actuating the flow meter and adapted to be energized in opposite directions to open and shut the flow meter, the motor and generator each having a winding and excitation means comprising an inductive Wheatstone bridge, an amplifier connected between said Wheatstone bridge and a winding of said motor to energize the same, means connecting a winding of said generator to said amplifier to feed back current produced in the generator winding to the winding of the motor to time-delay movement thereof, and a control member connected to the movable member of the nozzle to move therewith, said control member being adapted to modify reluctances in the bridge to change the direction of energization of the actuator in response to said movable member being moved across a preselected position thereof, for controlling the flow meter in a sense to decrease the flow of fuel in response to the movable member being more expanded than the preselected position, and in a sense to increase the flow of fuel in response to the movable member being more restricted than the preselected position.

2. In a turbojet having an afterburner, a flow meter for controlling the flow of fuel fed to the afterburner, a variable-area nozzle including at least one movable member adapted to be expanded and restricted to increase and decrease the area of the nozzle, and a nozzle area control to expand and restrict the movable member responsive to at least one operative characteristic of the turbojet, an afterburner control responsive to expansion and restriction of the movable member over a preselected position thereof which defines an area of the nozzle close to a maximum area and consisting of an electrically operable actuator comprising a motor and a generator having a common shaft for actuating the flow meter and adapted to be energized in opposite directions to open and shut the flow meter, the motor and generator each having a winding and excitation means comprising an inductive Wheatstone bridge, an amplifier connected between said Wheatstone bridge and a winding of said motor to energize the same, means connecting a winding of said generator to said amplifier to feed back current produced in the generator winding to the winding of the motor to time-delay movement thereof, and a control member connected to the movable member of the nozzle to move therewith, said control member being adapted to modify reluctances in the bridge to change the direction of energization of the actuator in response to said movable member being moved across a preselected position thereof, for controlling the flow meter in a sense to decrease the flow of fuel in response to the movable member being more expanded than the preselected position, and in a sense to increase the flow of fuel in response to the movable member being more restricted than the preselected position.

3. In an afterburner and variable-area nozzle-type turbojet having a nozzle-area varying system including at least one nozzle member movable between a maximum opening position and a minimum opening position through a preselected intermediate position, a regulating apparatus for moving said nozzle member in response to an operative parameter of the turbojet, and an afterburner fuel flow meter movable in either one of two operative directions for respectively decreasing and increasing afterburner fuel flow, the provision of a control device comprising:

a control member connected to said nozzle member to move therewith in first and second directions through a change-over position of the control member responsive to said nozzle member being moved towards one of said maximum and said minimum opening positions through said preselected intermediate position, respectively, means detecting passage of said control member through said change-over position thereof in either of said first and second directions, change-over position varying means operatively associated with said detecting means for deliberately modifying said change-over position, thereby correspondingly deliberately modifying said preselected intermerdiate position of said nozzle member, and flow-meter actuating means under the control of said detecting means for positively moving said flow meter in the operative direction thereof which provides a decrease in afterburner fuel flow upon said detecting means sensing passage of said control member through said change-over position thereof in said first direction thereof, and for positively moving said flow meter in the other operative direction thereof which provides an increase in afterburner fuel flow upon said detecting means sensing passage of said control member through said change-over position thereof in said second direction thereof, whereby said regulating apparatus operates to return said nozzle member to said preselected intermediate position thereof whenever it departs therefrom in either sense.

4. A control device as claimed in claim 3, wherein the detecting means comprises a component adapted to cooperate with a lever component connected to the control member, for sensing passage of the control member through the change-over position thereof, and the change-over varying means comprises means for shifting the fulcrum of said lever component.

5. A control device as claimed in claim 3, wherein the flow meter actuating means comprises a fluid motor for moving the flow meter, and the detecting means comprises a control valve having a component movable by the control member and adapted to co-operate with a stationary component to reverse direction of movement of said fluid motor in response to the control member passing through the change-over position.

6. A control device as claimed in claim 5, wherein the change-over position varying means comprises means for shifting said stationary component.

References Cited

UNITED STATES PATENTS

| | | | |
|---|---|---|---|
| 2,706,383 | 4/1955 | Jacobson | 60—237 |
| 2,789,417 | 4/1957 | Kuzmitz | 60—237 |
| 2,979,889 | 4/1961 | Hurtle et al. | 60—237 X |
| 3,007,303 | 11/1961 | Williams | 60—239 X |
| 3,014,676 | 12/1961 | Arnette et al | 60—237 X |
| 3,082,599 | 3/1963 | White et al. | 60—237 |
| 3,049,881 | 8/1962 | Braunagel et al. | 60—237 |
| 3,300,979 | 1/1967 | Aubert | 60—237 |

AL LAWRENCE SMITH, Primary Examiner

U.S. Cl. X.R.

60—238